Patented May 22, 1951

2,553,664

UNITED STATES PATENT OFFICE 2,553,664

TREATMENT OF CELLULOSE ESTERS

Mervin E. Martin and Laurence G. Reed, Cumberland, Md., assignors to Celanese Corporation of America, a corporation of Delaware No Drawing. Application February 28, 1947, Serial No. 731,710

13 Claims. (Cl. 260—230)

This invention relates to the production of organic acid esters of cellulose and relates more particularly to the production and treatment of organic acid esters of cellulose of improved molding properties and color characteristics.

An object of this invention is to provide an improved process for the production of organic acid esters of cellulose, having superior molding properties and which may be molded at elevated temperatures to yield products of high clarity, stability and with little or no developed color.

Another object of this invention is the production of improved organic acid esters of cellulose by a novel process involving filtration, stabilization and extraction operations whereby the molding qualities of said organic acid esters of cellulose are considerably improved.

Other objects of this invention will appear from the following detailed description.

While our invention will be particularly described in connection with the preparation of cellulose acetate of improved molding properties, it is to be understood that our novel process may be employed with equally valuable results in the preparation of other organic acid esters of cellulose of improved molding properties such as cellulose propionate and cellulose butyrate as well as mixed esters such as cellulose acetate-propionate and cellulose acetate-butyrate.

Cellulose acetate and other thermoplastic organic acid esters of cellulose are extensively employed, for example, in the production of a wide variety of industrially valuable molded products. When suitably compounded with plasticizers, pigments, effect materials, and other modifying agents, the organic acid esters of cellulose may be subjected to molding operation under heat and pressure and molded articles of substantial utility may be obtained. To be entirely satisfactory for the widest application, cellulose acetate which is to be subjected to molding operations must possess several important characteristics. Thus, it must yield clear, transparent and haze-free articles which are free of brittleness, and, too, little or no color should develop during molding to shift the color from a clear, limpid, water-white color to a yellowish, or brownish tint. The development of color appears to be due to the presence of certain color-forming bodies whose exact nature and/or origin is not known. It is essential, however, that these bodies be removed or their effects minimized if the cellulose esters are to be entirely satisfactory for molding operations.

Another important factor in the production of satisfactory molding articles is the degree of stability of the cellulose acetate employed. The stability should be such that the cellulose acetate may be molded without suffering any substantial molecular degradation and consequent viscosity loss.

We have now found that the stability of cellulose acetate or other organic acid ester of cellulose materials may be substantially improved and the color-forming bodies which develop yellowish or brownish tints therein during molding operations may be removed by subjecting the cellulose acetate or other organic acid ester of cellulose to an improved purification process. In accordance with the novel process of our invention, as applied to cellulose acetate, the stability thereof may be improved and the color-forming bodies may be substantially removed therefrom, if the primary solution of cellulose acetate obtained following esterification is filtered, the cellulose acetate precipitated from solution, the precipitated cellulose acetate stabilized by heating the cellulose acetate at an elevated temperature and pressure in an aqueous medium of low alkalinity and the precipitated, stabilized cellulose acetate then subjected to extraction with an organic liquid having a solvent action on color-forming bodies and substantially no solvent action on the cellulose acetate. This sequence of operations is of the utmost importance since it results in the production of cellulose acetate which is unusually valuable for molding operations and yields molded articles of excellent stability and a superior degree of freedom from developed color. The unusual degree of clarity and the substantially total lack of any developed color enables the cellulose acetate prepared in accordance with our invention to be employed satisfactorily not only in the production of molded articles of light or pastel shades, but also in the production of clear, transparent molded articles where freedom from developed color is of paramount importance.

The cellulose acetate may be prepared in a conventional manner, i. e. by treating cellulosic materials such as, for example cotton, cotton linters, wood pulp or regenerated cellulose, with an esterification medium comprising acetic acid anhydride, an esterification catalyst, such as sulfuric acid, and acetic acid which is a solvent for the cellulose acetate being formed. Fully esterified cellulose acetate is produced and is obtained in the form of a viscous homogeneous solution. Water is then added to this primary cellulose acetate solution in an amount sufficient to convert any acetic acid anhydride remaining to acetic acid. An additional amount of water for ripening is usually added and the primary cellulose acetate is then permitted to hydrolyze or ripen after some or all of the sulfuric acid catalyst has been neutralized. On ripening, the primary cellulose triacetate is converted to a secondary cellulose acetate, which is of a lower degree of acetylation and has the desired solubility characteristics. However, when ripening is completed the solution is diluted prior to filtration by the addition of 20 to 50% aqueous acetic acid in an amount of 40 to 110% on the weight of the solution. The dilution causes a desirable lowering of the viscosity of the solution and helps to solubilize any insoluble inorganic crystalline matter present which may form as a result of the neutralization of the sulfuric acid catalyst when ripening.

The filtration of the ripened cellulose acetate solution may be carried out at temperatures of 30 to 60° C. but optimum results are achieved when filtration is effected at temperatures of about 50° C. Following filtration, the cellulose acetate is precipitated from the filtered solution by the addition of a large excess of water or other non-solvent. The precipitated cellulose acetate is washed with water to remove as much acid and other soluble materials as possible and is then subjected to a stabilization treatment which comprises heating the ripened precipitated cellulose acetate with from 10 to 20 volumes of distilled or demineralized water containing less than 5 parts per million alkalinity at superatmospheric pressures of 10 to 85 pounds per square inch for from ½ to 6 hours, or longer. The pressure stabilization effects a substantial reduction in the combined sulfuric acid of the cellulose acetate, and aids in decreasing the color-forming bodies present.

The stabilized cellulose acetate is now subjected to extraction with an aliphatic alcohol such as methyl, ethyl or isopropyl alcohols, which alcohols have a solvent action on the color-forming bodies present in the stabilized cellulose acetate but have substantially no solvent action on the cellulose acetate itself. Preferably, we employ aqueous ethyl alcohol as the extractant and the latter may contain from 40 to 100% ethyl alcohol by weight. Where ethyl alcohol is employed, optimum results are achieved when the extractions are effected while maintaining the alcohol at a temperature of from about 30° C. to the boiling point of the alcohol. Higher temperatures may be employed if the extraction process is carried out under super atmospheric pressures. The temperature, however, should not be so high as to cause fusion of the cellulose acetate. The ethyl alcohol is permitted to act on the cellulose acetate for 5 minutes to 2 hours, drained therefrom and then replaced by fresh alcohol. From 2 to 8 changes of alcohol are usually sufficient to effect a satisfactory extraction of the color-forming bodies. However, we have found that sometimes as many as 20 changes may be necessary. In lieu of an intermittent process, a continuous extraction may be effected, the ethyl alcohol extractant being removed continuously, vaporized to separate it from the color-forming bodies, condensed, and then returned to the vessel containing the cellulose acetate being extracted whereby it may effect further extraction.

In the treatment of cellulose acetate in accordance with our novel process, undried or dried cellulose acetate may be extracted, however, we prefer to dry the cellulose acetate following stabilization and prior to extraction. In the case of cellulose propionate, however, we have found that the wet cellulose propionate obtained following the stabilization at elevated temperature and pressure may be subjected to extraction while in a wet state and without any initial drying, and yields a better result.

In order further to illustrate our invention, but without being limited thereto, the following examples are given:

*Example 1*

100 parts by weight of cotton linters are pretreated for 3 hours at 25° C. with a mixture of 35 parts by weight of glacial acetic acid, 0.5 part by weight of sulfuric acid and 0.5 part by weight of water and the pretreated cotton linters then entered into an acetylizer containing a mixture of 245 parts by weight of acetic anhydride, 325 parts by weight of glacial acetic acid and 11.5 parts by weight of sulfuric acid cooled to −10° C. The temperature rises to a peak of about 35° C. after one hour and acetylation is completed in about 2 hours. Sufficient water is added to convert any of the acetic anhydride remaining to acetic acid, 11.5 parts of the sulfuric acid present are neutralized and 43 parts of water are then added for ripening. The temperature of the primary cellulose acetate solution is raised to 100° C. and is ripened for 6 hours, or until the ripened cellulose acetate has an acetyl value of 56%, calculated as acetic acid. The remaining sulfuric acid is neutralized, the ripened solution diluted with 60% on the weight of the solution of 40% aqueous acetic acid and then filtered while at a temperature of 35° C. under a pressure of 100 pounds per square inch through a filter dressing comprising 10 plies of Madapolam, a cotton cloth of 50 to 60 thread count. After filtration, the cellulose acetate in solution is precipitated by the addition of a large excess of water and washed with distilled water until the effluent wash water contains 0.1% acetic acid. The wet cellulose acetate flakes are then entered into a stabilizer where they are heated to a temperature of 131° C. under a pressure of 40 pounds per square inch for 30 minutes in the presence of 15 parts by weight of distilled water. The stabilized cellulose acetate is dried and then continuously extracted counter currently with 90% aqueous ethyl alcohol at 68° C. for 37.5 minutes employing about 10.8 parts by weight of the ethyl alcohol solution for each part by weight of cellulose acetate. The extracted cellulose acetate is then dried.

When the filtered, stabilized and extracted cellulose acetate is molded into discs at 200° C. for 15 minutes employing 30 parts by weight of diethyl phthalate, as plasticizer, for each 100 parts by weight of cellulose acetate, the discs obtained have a yellowness coefficient of 0.16 and suffer a viscosity loss of 18%. Discs molded of cellulose acetate prepared in the same way without being extracted have a yellowness coefficient of 0.19 and suffer a viscosity loss on molding of 67%. Cellulose acetate which has been washed with distilled water and not pressure stabilized and extracted following precipitation cannot be molded satisfactorily since it suffers such a serious viscosity loss that it breaks down and runs from the mold.

The numerical expression of color development, i. e. the yellowness coefficient is obtained by dividing the light transmission of the disc at 440 mu by that at 640 mu and subtracting the result from unity. The greater this coefficient the greater the degree of color.

Example II 100 parts by weight of cotton linters are pretreated for 5 hours at 25° C. with a mixture of 30 parts by weight of 99.8% propionic acid, 11 parts by weight of 85% formic acid and 0.55 part by weight of sulfuric acid and the pretreated cotton linters then entered into a reactor containing a mixture of 400 parts by weight of 97% propionic acid anhydride and 1.65 parts by weight of sulfuric acid cooled to −15° C. The temperature rises to a peak of about 30° C. after 3½ hours, and becomes fairly clear as shown under a microscope, after a total of about 5 hours esterification time. 315 parts by weight of 99.8% propionic acid is stirred into the batch and the reaction continued until a clear solution is obtained after about 8 hours total esterification time. Sufficient water is added to convert any of the propionic anhydride remaining to propionic acid and 15 parts of water are then added for ripening. The temperature of the primary cellulose propionate solution is raised to 60° C. while 25 parts of water are slowly added as the temperature is raised to 60° C. The temperature is held at 60° C. for 4 hours or until the ripened cellulose propionate has a propionyl value of 63 per cent, calculated as propionic acid. The sulfuric acid in the ripened cellulose propionate solution is then neutralized completely, the solution diluted with 50% on the weight of the solution of 40% aqueous propionic acid while at 60° C. and then filtered as described in Example I. The cellulose propionate in the filtered solution is precipitated by the addition of an excess of water thereto, washed to 0.06% acidity with distilled water and then pressure stabilized at 138° C. at about 50 pounds per square inch pressure for 1.75 hours. The stabilized cellulose propionate is then washed neutral to bromthymol blue with distilled water and then washed several more times with distilled water. The wet, stabilized cellulose propionate is then countercurrently extracted with 65% aqueous ethyl alcohol at 67° C. Distilled water is added to dilute the alcohol in forming the extractant. The cellulose propionate is continuously extracted for 30 minutes while maintaining about 7.6 parts by weight of ethyl alcohol in contact with each part by weight of cellulose propionate during the extraction, the extractant being changed every 2.3 minutes. The cellulose propionate may also be extracted by a batch process instead of by a continuous process. Thus, the wet cellulose propionate is stirred for one-half hour at 67° C. in 12 parts by weight of 60% by weight aqueous ethyl alcohol, allowed to settle for one-half hour and then 6 parts of the extractant are withdrawn, replaced by an equal amount of fresh extractant and the extraction repeated. Four extractions in all are effected. The amount of water on the wet cellulose propionate is taken into account in making up the alcohol-water mixture for the first extraction. The extracted cellulose propionate is then dried and molded into discs at 200° C. for 30 minutes without employing any plasticizer. The molded discs have a yellowness coefficient of 0.28 and suffer a viscosity loss of 26%. Cellulose propionate produced in the same manner and stabilized as above but without extraction yields molded discs having a yellowness coefficient of 0.32 and suffers a viscosity loss of 72%.

It is to be understood that the foregoing detailed description is given merely by way of illustration and that many variations may be made therein without departing from the spirit of our invention.

Having described our invention, what we desire to secure by Letters Patent is:

1. In a process for the production of lower aliphatic acid esters of cellulose of improved molding properties wherein the lower aliphatic acid ester of cellulose employed is prepared by esterifying cellulose with a lower aliphatic acid anhydride in the presence of an acid esterification catalyst and the lower aliphatic acid ester of cellulose solution is ripened to the desired acyl value, the steps which comprise filtering the solution of ripened lower aliphatic acid ester of cellulose, precipitating the ripened lower aliphatic acid ester of cellulose from solution, stabilizing the precipitated cellulose ester by heating the latter at an elevated temperature and superatmospheric pressure in an aqueous medium of less than 5 parts per million alkalinity, and after the stabilization treatment subjecting the lower aliphatic acid ester of cellulose to extraction with a lower aliphatic alcohol to dissolve color-forming bodies without substantially dissolving the lower aliphatic acid ester of cellulose.

2. In a process for the production of cellulose acetate of improved molding properties wherein the cellulose acetate employed is prepared by esterifying cellulose with acetic anhydride in the presence of an acid esterification catalyst and the cellulose acetate is ripened to the desired acetyl value, the steps which comprise filtering the solution of ripened cellulose acetate, precipitating the ripened cellulose acetate from solution, stabilizing the precipitated cellulose acetate by heating the latter at an elevated temperature and superatmospheric pressure in an aqueous medium of less than 5 parts per million alkalinity, and subjecting the stabilized cellulose acetate to extraction with a lower aliphatic alcohol to dissolve color-forming bodies without substantially dissolving the cellulose acetate.

3. In a process for the production of cellulose propionate of improved molding properties wherein the cellulose propionate employed is prepared by esterifying cellulose with propionic acid anhydride in the presence of an acid esterification catalyst and the cellulose propionate is ripened to the desired propionyl value, the steps which comprise filtering the solution of ripened cellulose propionate, precipitating the ripened cellulose propionate from solution, stabilizing the precipitated cellulose by heating the latter at an elevated temperature and superatmospheric pressure in an aqueous medium of less than 5 parts per million alkalinity, and subjecting the stabilized cellulose propionate to extraction with a lower aliphatic alcohol to dissolve color-forming bodies without substantially dissolving the cellulose propionate.

4. In a process for the production of lower aliphatic acid esters of cellulose of improved molding properties wherein the lower aliphatic acid ester of cellulose employed is prepared by esterifying cellulose with a lower aliphatic acid anhydride in the presence of an acid esterification catalyst and the lower aliphatic acid ester of cellulose solution is ripened to the desired acyl value, the steps which comprise filtering the solution of ripened lower aliphatic acid ester of cellulose, precipitating the ripened lower aliphatic acid ester of cellulose from solution, stabilizing the precipitated cellulose ester by heating the latter at an elevated temperature and superatmospheric pressure in an aqueous medium of less than 5 parts per million alkalinity, and after the stabilization treatment subjecting the lower aliphatic acid ester of cellulose to a plurality of extractions with a lower aliphatic alcohol to dissolve color-forming bodies without substantially dissolving the lower aliphatic acid ester of cellulose.

5. In a process for the production of lower aliphatic acid esters of cellulose of improved molding properties wherein the lower aliphatic acid ester of cellulose employed is prepared by esterifying cellulose with a lower aliphatic acid anhydride in the presence of an acid esterification catalyst and the lower aliphatic acid ester of cellulose solution is ripened to the desired acyl value, the steps which comprise filtering the solution of ripened lower aliphatic acid ester of cellulose from solution, stabilizing the precipitated cellulose ester by heating the latter at an elevated temperature and superatmospheric pressure in an aqueous medium of less than 5 parts per million alkalinity, and after the stabilization treatment subjecting the lower aliphatic acid ester of cellulose to a plurality of extractions with ethyl alcohol at an elevated temperature.

6. In a process for the production of cellulose acetate of improved molding properties wherein the cellulose acetate employed is prepared by esterifying cellulose with acetic anhydride in the presence of an acid esterification catalyst and the cellulose acetate is ripened to the desired acetyl value, the steps which comprise filtering the solution of ripened cellulose acetate, precipitating the ripened cellulose acetate from solution, stabilizing the precipitated cellulose acetate by heating the latter at an elevated temperature and superatmospheric pressure in an aqueous medium of less than 5 parts per million alkalinity, and subjecting the stabilized cellulose acetate to a plurality of extractions with ethyl alcohol at an elevated temperature.

7. In a process for the production of cellulose propionate of improved molding properties wherein the cellulose propionate employed is prepared by esterifying cellulose with propionic acid anhydride in the presence of an acid esterification catalyst and the cellulose propionate is ripened to the desired propionyl value, the steps which comprise filtering the solution of ripened cellulose propionate, precipitating the ripened cellulose propionate from solution, stabilizing the precipitated cellulose propionate by heating the latter at an elevated temperature and superatmospheric pressure in an aqueous medium of less than 5 parts per million alkalinity, and subjecting the stabilized cellulose propionate to a plurality of extractions with ethyl alcohol at an elevated temperature.

8. In a process for the production of cellulose acetate of improved molding properties wherein the cellulose acetate employed is prepared by esterifying cellulose with acetic anhydride in the presence of an acid esterification catalyst and the cellulose acetate is ripened to the desired acetyl value, the steps which comprise, diluting the ripened cellulose acetate solution with aqueous acetic acid, filtering the diluted solution of ripened cellulose acetate, precipitating the ripened cellulose acetate from solution, stabilizing the precipitated cellulose acetate by heating the latter for ½ to 6 hours in an aqueous medium of less than 5 parts per million alkalinity at a superatmospheric pressure of 10 to 85 pounds per square inch, and subjecting the stabilized cellulose acetate to a plurality of extractions with ethyl alcohol at an elevated temperature.

9. In a process for the production of cellulose propionate of improved molding properties wherein the cellulose propionate employed is prepared by esterifying cellulose with propionic acid anhydride in the presence of an acid esterification catalyst and the cellulose propionate is ripened to the desired propionyl value, the steps which comprise diluting the ripened cellulose propionate solution with aqueous propionic acid, filtering the diluted solution of ripened cellulose propionate, precipitating the ripened cellulose propionate from solution, stabilizing the precipitated cellulose propionate by heating the latter for ½ to 6 hours in an aqueous medium of less than 5 parts per million alkalinity, at a superatmospheric pressure of 10 to 85 pounds per square inch, and subjecting the stabilized cellulose propionate to a plurality of extractions with ethyl alcohol at an elevated temperature.

10. In a process for the production of cellulose acetate of improved molding properties wherein the cellulose acetate employed is prepared by esterifying cellulose with acetic anhydride in the presence of an acid esterification catalyst and the cellulose is ripened to the desired acetyl value, the steps which comprise diluting the ripened cellulose acetate solution with 40 to 110% by weight of 20 to 50% aqueous acetic acid, filtering the diluted solution of ripened cellulose acetate, precipitating the ripened cellulose acetate from the filtered solution, stabilizing the precipitated cellulose acetate by heating the latter for ½ to 6 hours at a superatmospheric pressure of 10 to 85 pounds per square inch with from 10 to 20 volumes of an aqueous medium of less than 5 parts per million alkalinity, and subjecting the stabilized cellulose acetate to extraction with aqueous ethyl alcohol at an elevated temperature.

11. In a process for the production of cellulose propionate of improved molding properties wherein the cellulose propionate employed is prepared by esterifying cellulose with propionic acid anhydride in the presence of an acid esterification catalyst and the cellulose propionate is ripened to the desired propionyl value, the steps which comprise diluting the ripened cellulose propionate solution with 40 to 110% by weight of 20 to 50% aqueous propionic acid, filtering the diluted solution of ripened cellulose propionate, precipitating the ripened cellulose propionate from the filtered solution, stabilizing the precipitated cellulose propionate by heating the latter for ½ to 6 hours at a superatmospheric pressure of 10 to 85 pounds per square inch with from 10 to 20 volumes of an aqueous medium of less than 5 parts per million alkalinity, and subjecting the stabilized cellulose propionate to extraction with aqueous ethyl alcohol at an elevated temperature.

12. In a process for the production of cellulose acetate of improved molding properties wherein the cellulose acetate employed is prepared by esterifying cellulose with acetic anhydride in the presence of an acid esterification catalyst and the cellulose is ripened to the desired acetyl value, the steps which comprise diluting the ripened cellulose acetate solution with 70 to 110% by weight of 20 to 50% aqueous acetic acid, filtering the diluted solution of ripened cellulose acetate, precipitating the ripened cellulose acetate from the filtered solution, stabilizing the precipitated cellulose acetate by heating the latter for ½ to 6 hours at a superatmospheric pressure of 10 to 85 pounds per square inch with from 10 to 20 volumes of an aqueous medium of less than 5 parts per million alkalinity, and subjecting the stabilized cellulose acetate to extraction with aqueous ethyl alcohol at a temperature above 30° C.

13. In a process for the production of cellulose propionate of improved molding properties wherein the cellulose propionate employed is prepared by esterifying cellulose with propionic acid anhydride in the presence of an acid esterification catalyst and the cellulose propionate is ripened to the desired propionyl value, the steps which comprise diluting the ripened cellulose propionate solution with 40 to 110% by weight of 20 to 50% aqueous propionic acid, filtering the diluted solution of ripened cellulose propionate, precipitating the ripened cellulose propionate from the filtered solution, stabilizing the precipitated cellulose propionate by heating the latter for ½ to 6 hours at a superatmospheric pressure of 10 to 85 pounds per square inch with from 10 to 20 volumes of an aqueous medium of less than 5 parts per million alkalinity, and subjecting the stabilized cellulose propionate to extraction with aqueous ethyl alcohol at a temperature above 30° C.

MERVIN E. MARTIN.
LAURENCE G. REED.

REFERENCES CITED

The following references are of record in the file of this patent:

UNITED STATES PATENTS

| Number | Name | Date |
| --- | --- | --- |
| 1,832,381 | Hagedorn | Nov. 17, 1931 |
| 1,993,782 | Haney | Mar. 12, 1935 |
| 2,365,258 | Farquhar et al. | Dec. 19, 1944 |
| 2,400,494 | Fisher | May 21, 1946 |
| 2,414,869 | Haney et al. | Jan. 28, 1947 |

OTHER REFERENCES

Sookne et al., Journal of Research of the National Bureau of Standards, Vol. 29, August 1942, pages 123, 124.

Ser. No. 242,290, Schuller et al (A. P. C.), published April 20, 1943.